Patented June 2, 1925.

1,540,049

UNITED STATES PATENT OFFICE.

ROBERT R. WILLIAMS, OF ROSELLE, NEW JERSEY, ASSIGNOR TO WESTERN ELECTRIC COMPANY, INCORPORATED, OF NEW YORK, N. Y., A CORPORATION OF NEW YORK.

PLASTIC COMPOSITION.

No Drawing. Application filed June 30, 1921. Serial No. 481,640.

*To all whom it may concern:*

Be it known that I, ROBERT R. WILLIAMS, a citizen of United States, residing at Roselle, in the county of Union, State of New Jersey, have invented certain new and useful Improvements in Plastic Compositions, of which the following is a full, clear, concise, and exact description.

This invention relates to the art of producing plastic compositions, and particularly to the production of such compositions when a filling material is used.

In the manufacture of plastic compositions it is common practice to use a filling material in order to give to the composition the desired properties, such as toughness, firmness, non-adhesiveness, etc. This filling material may be present in varying quantities and also may be used in a variety of forms. Where the object is to cheapen the composition more particularly, a large amount of filler is employed, even up to 80% of the composition in some cases. The filling material may be in very finely divided form, in comparatively large particles or, indeed, may consist of textile fabrics or fibres.

It is an object of this invention to provide a process whereby the properties of plastic compositions may be greatly improved by so treating the filler to be incorporated therein that it becomes more intimately associated with the plastic employed, in such a way as to secure a minimum porosity and a maximum cohesion. It is also an object of the invention to improve the mechanical properties of plastic compositions and also the electrical properties of such compositions used as insulating material. The improvement is particularly applicable to insulation for submarine cables, the improved electrical properties being those which there play an important rôle.

The following description will be restricted somewhat to the application of the present invention when gums, such as rubber, balata, gutta percha, etc. are employed. The disclosure will be made specific to this example, with the understanding that generic aspects of the invention may be comprehended in the terms of the appended claims.

The incorporation of fillers with rubber is attended by a diminution of distensibility and if carried too far, results in a decrease of mechanical strength; and in the case of electrical insulation, in a diminished dielectric strength and moisture resistance. Above certain limits the weakening of the article in these particulars is directly proportional to the additional amounts of filler used. This is due to the fact that such rubber compositions consist of particles of filler more or less thoroughly cemented together by a magma of rubber. Mechanically and electrically, as well as in point of water-absorption, the point of greatest weakness is not in the substance of the rubber nor of the filler, but in the joint, bond, or union between the two. This weakness is inherent in such compositions whether of low or high filler content. It is most serious in the latter case because the number of such joints per unit volume of material is increased.

It has been found that the removal of small amounts of moisture from fillers prior to compounding of the same with rubber, is actually detrimental to the ultimate properties of the compound, the indications being that porosity and poor cementation are increasel thereby. The reason for this appears to be that the removal of moisture permits the subsequent adsorption of additional amounts of air in lieu of the moisture removed. This adsorption of air takes place during or prior to mixing the filler with rubber unless special precautions are taken to prevent it. Inasmuch as rubber is ordinarily stored in air, the mass of rubber as it is worked on the mill, is saturated with the normal atmospheric constituents and is incapable of dissolving any adsorbed layer of atmospheric gases upon the surface of the filler particles. However, the rubber is not normally saturated with water and is consequently capable of taking up adsorbed moisture from the filler particles producing a more intimate cementation of rubber to the filler. In a copending application, Serial No. 416,519, filed Oct. 12, 1920, a method of initially subjecting the filler particles to a degasifying treatment in order to remove all adsorbed and occluded gases therefrom to thereby secure a stronger bond between the filler particles and the surrounding magma of rubber, is described. In this case, to secure the best results, re-adsorption of atmospheric gases prior to or during mixing with the rubber, must be avoided, involving a procedure which is sometimes mechanically inconvenient.

In accordance with the present invention, the filler is impregnated with a gas which is soluble in rubber. In order to effect a complete impregnation, it has been found convenient to subject the filler first to a degasifying treatment and then allow it to come in contact with the gas which has been found advantageous to effect the desired result.

In carrying out the process of this invention, when whiting was used as a filler material, about two pounds of the finely divided particles thereof were placed in a chamber adapted to be evacuated. The pressure within the chamber was reduced to a small value and then the filler particles were heated up to about 160° C. at which temperature they were maintained for about two hours. The heating was then discontinued and the pressure within the chamber was gradually increased by causing carbon dioxide to flow in. When the chamber had cooled to the temperature of the room, the whiting was removed and was incorporated into the rubber.

The whiting was added to about a pound of smoked sheet rubber and an ounce of sulphur and with these ingredients, mixed into a dough. This dough was calendered into sheets 0.05 inch thick and plated between tin foils and vulcanized for forty minutes at 62½ pounds steam pressure. After this treatment the sheets were dried thoroughly in a vacuum desiccator over sulphuric acid.

The capacity of a sheet made in this manner was found to be 350 M. M. F., and the insulation resistance $2.4 \times 10^5$ megohms. A sheet made up in a similar way, except that the sheet was not subjected either to a gasifying or degasifying treatment, showed a capacity of 352 M. M. F. and an insulation resistance of $6.5 \times 10^6$ megohms.

In order to put these specimens under test to ascertain their respective porosity, they were immersed in a salt solution for fourteen days. When removed and the surface dried, the sheet containing the degasified filler showed a capacity of 425 M. M. F. and an insulation resistance of $1.4 \times 10^4$ megohms; while the sheet containing the untreated filler, showed a capacity of 790 M. M. F. and an insulation resistance of $6.3 \times 10^2$ megohms. Thus the result of pretreating the filler was to greatly lessen the increase in electrical capacity due to the effect of the salt water, and to prevent an undue decrease in the insulation resistance of the compound. This pretreated compound therefore constitutes an improved form of electrical insulation and is particularly useful as insulation for submarine cables, low electrostatic capacity being there of great moment as well as high resistivity.

It is apparent from a comparison of the electrical tests of the two kinds of sheets above recorded, that the penetration of water with consequent increase of capacity and decrease of insulation resistance is greatly reduced by the process of removing gases from the filler and substituting therefor a gas which is more soluble in rubber, such as for example carbon dioxide. Fillers other than whiting may, of course, be treated in the same way with similar beneficial results. Other gases which are fairly freely soluble in rubber may be used advantageously in place of carbon dioxide but it is desirable to select such gases as will have no serious injurious action of a chemical character upon the rubber itself. Such gases, freely soluble in rubber, form a protecting envelope about the filler particle and prevent the rapid adsorption of other gases prior to or during the mixing operations. Such protective gas envelopes, by reason of the solubility of the gases chosen, dissolve in the rubber during mixing and subsequent operations and are thereby removed from the interstices between the filler particles and the rubber. Before molding the dough in the finished form and vulcanizing the same, any large excess of such gas dissolved in the rubber, is preferably removed by prolonged exposure to the air or by mastication under diminished pressure.

What is claimed is:

1. Rubber composition containing a rubber matrix and a filler which has been treated with gas soluble in the matrix.

2. Electrical insulating composition comprising a matrix of insulating material and an insulating filling material in which gas insoluble in the material of the matrix has been replaced by gas which is relatively soluble therein.

3. Electrical insulating composition comprising a matrix of rubber and an insulating filling material treated with a gas which is soluble in rubber.

4. A rubber composition containing a rubber matrix and a filler which has been treated with carbon dioxide.

5. A rubber article containing a filler, said filler having been treated with gases which are soluble in rubber.

6. A rubber article containing a filler in which substantially all gases, relatively insoluble in rubber, have been replaced by relatively soluble gases.

7. A rubber article containing a filler, said filler having been treated with gases which are soluble in rubber and which are not already dissolved therein.

8. A rubber article containing a filler which has been treated with gases which are soluble in rubber, and from which article the excess dissolved gas has been removed.

9. The step in the treatment of fillers for plastic compositions which consists in removing gases therefrom and replacing these gases by a gas which is relatively highly soluble in the binding material of plastic composition.

10. The step in the treatment of fillers for rubber articles which consists in removing gases therefrom and replacing these gases by a gas which is relatively highly soluble in rubber.

11. The step in the manufacture of rubber articles containing a filler which consists in subjecting said filler to a degasifying treatment, replacing the removed gases with a gas relatively soluble in rubber, and then intermixing said filler with a rubber magma.

12. The step in the manufacture of rubber articles which contain a filler, which consists in subjecting said filler to a degasifying treatment, replacing the removed gases with a gas relatively soluble in rubber, intermixing said filler with the rubber magma, and subsequently removing the excess gas dissolved in said rubber.

13. The step in the manufacture of rubber articles which contain a filler, which consists in degasifying said filler, replacing the removed gases with a gas relatively soluble in rubber, intermixing said filler with the rubber magma, and subsequently removing excess gas dissolved in the rubber by mastication under diminished pressure.

14. In the manufacture of rubber compositions, the process which comprises heating a filler in vacuum to remove the adsorbed atmospheric gases, replacing these gases by some gas which is relatively highly soluble in rubber and which is not contained in the original rubber in any appreciable amount, and subsequently intermixing said filler and the rubber magma.

15. In the manufacture of rubber compositions, the process which comprises heating a filler in vacuum to remove the adsorbed atmospheric gases, replacing these gases by some gas which is relatively highly soluble in rubber and which is not contained in the original rubber in any appreciable amount, intermixing said filler and the rubber magma, and subsequently removing the excess gas from said composition.

In witness whereof, I hereunto subscribe my name this 28th day of June A. D., 1921.

ROBERT R. WILLIAMS.